United States Patent [19]

Hajicek et al.

[11] 3,748,447

[45] July 24, 1973

[54] APPARATUS FOR PERFORMING A LINEAR INTERPOLATION ALGORITHM

[75] Inventors: James D. Hajicek, Minneapolis; Ralph E. Sipple, New Brighton, both of Minn.

[73] Assignee: Sperry Rand Corporation, New York, N.Y.

[22] Filed: Nov. 18, 1971

[21] Appl. No.: 199,953

[52] U.S. Cl. .................................................. 235/152

[51] Int. Cl. .......................... G06f 1/02, G05b 19/24

[58] Field of Search .................. 235/151.11, 150.31, 235/152, 197; 318/570, 573, 600; 444/1

[56] References Cited

UNITED STATES PATENTS

| | | | |
|---|---|---|---|
| 3,678,258 | 7/1972 | Patmore et al. | 235/197 X |
| 3,247,365 | 4/1966 | Dell et al. | 235/152 X |
| 3,412,240 | 11/1968 | Hunt et al. | 235/152 X |
| 3,564,230 | 2/1971 | Carossi | 235/197 |
| 3,524,049 | 8/1970 | Gotz et al. | 235/152 X |

*Primary Examiner*—Eugene G. Botz
*Assistant Examiner*—Jerry Smith
*Attorney*—Thomas J. Nikolai

[57] ABSTRACT

A linear interpolation and numerical integration system employing U, X and Y arrays for computing additional sets of X and Y points in an X-Y coordinate system from a number of known sets of X and Y points. The U array is used to access 1P, ΔP and 2P values which constitute assigned points along the X axis and reference the known X points. Computation of the additional Y points is done in accordance with the expression:

$$Y_i = X_K + F(X_{K+1} - X_K)$$

where F is a fractional portion of the 1P value, which fractional portion is increased by ΔP each computation of $Y_i$. The necessary indexing and updating of the X and U array addresses and the P values is accomplished in an indexing section which operates time independently of the arithmetic means, thus permitting simultaneous computation and indexing functions in different $Y_i$ determinations.

8 Claims, 14 Drawing Figures

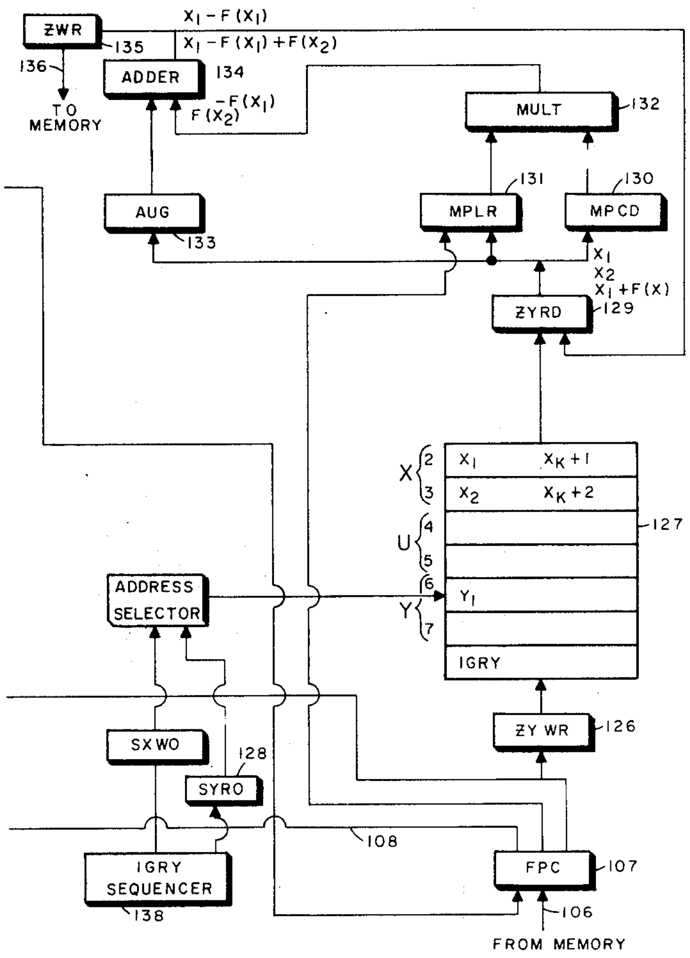
ZWR
135
136
TO MEMORY
ADDER
134
$X_1 - F(X_1)$
$X_1 - F(X_1) + F(X_2)$
$-F(X_1)$
$F(X_2)$
MULT
132
AUG
133
MPLR
131
MPCD
130
$X_1$
$X_2$
$X_1 + F(X)$
ZYRD
129
$X_1$
$X_K+1$
$X_2$
$X_K+2$
127
Y1
IGRY
ADDRESS SELECTOR
SXWO
SYRO
128
ZY WR
126
IGRY SEQUENCER
138
108
FPC
107
106
FROM MEMORY

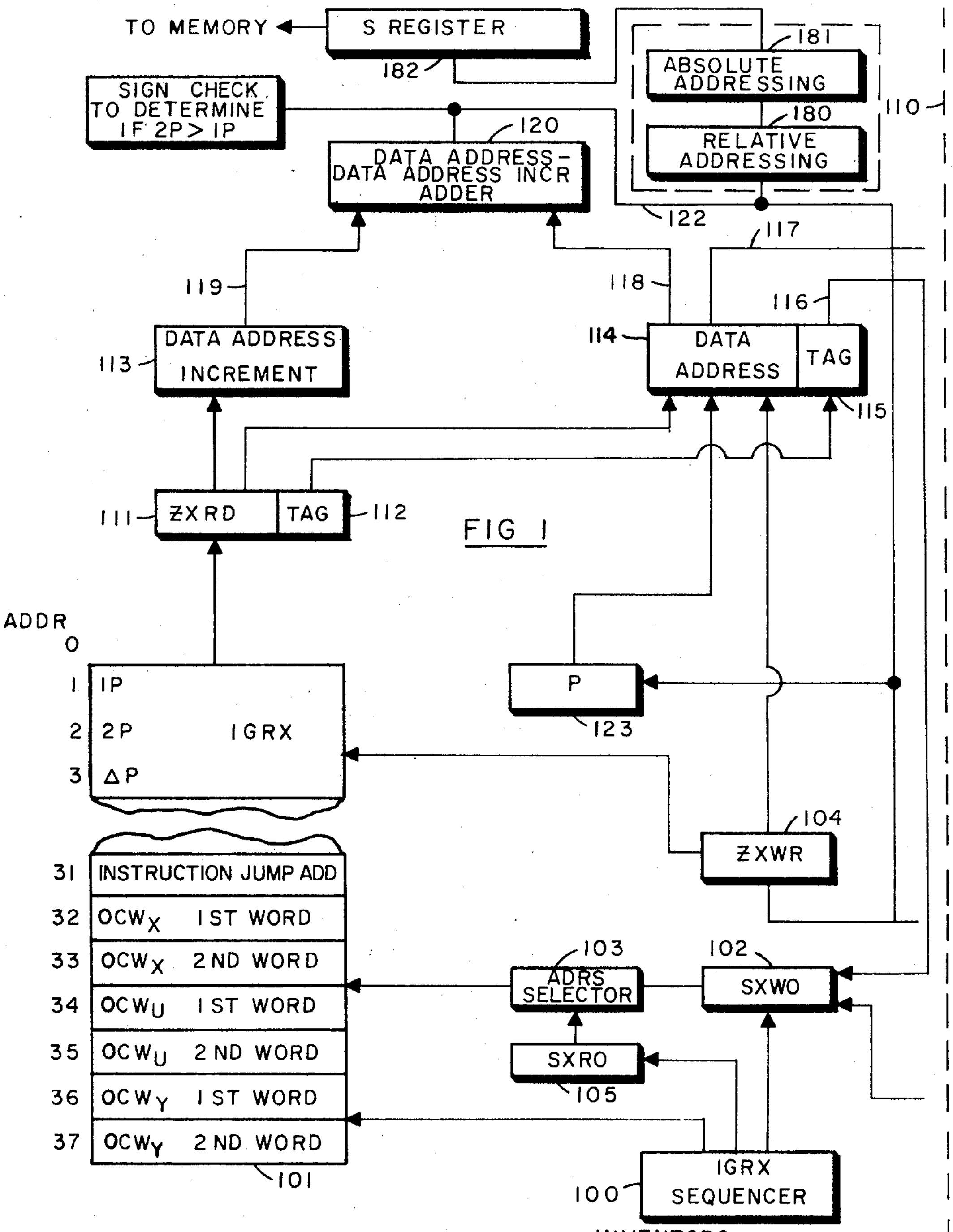
FIG 1
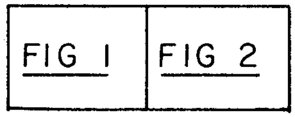
FIG 1 FIG 2
FIG 2A
INVENTORS
RALPH E. SIPPLE
JAMES D. HAJICEK
BY Donald W. Phillion
ATTORNEY 1. THIS DIAGRAM ASSUMES IP, 2P $\Delta$P LOADED INTO IGR
2. $Y_C$ = Y COUNT $Y_A$ = Y ADDRESS $Y_I$ = Y INDEX
   $Y_C$ = X COUNT $Y_A$ = Y ADDRESS $X_I$ = X INDEX
   F = LOWER HALF OF IP
3. EACH SQUARE REPRESENTS ONE CYCLE.

THE INTERPOLATION INSTRUCTION CAN BE REPRESENTED BY THE FOLLOWING EXPRESSION:

$$Y_I \leftarrow Y_I + X_{K+1} + F(X_{K+2} - X_{K+1})$$

APPARATUS FOR PERFORMING A LINEAR INTERPOLATION ALGORITHM

This invention relates generally to means for effecting linear interpolation from incomplete data and more specifically to the effecting of linear interpolation by means of hardware in a data processor.

BACKGROUND OF THE INVENTION

Frequently data obtained from a test is incomplete and contains data that is obviously inaccurate. In such cases it is often desirable to select that portion of the data which is believed to be reasonably accurate and then, through the use of linear interpolation, create additional points or create additional data. For example, in seismographic work, a sonic signal is caused to be propagated from a source down into the earth. Geophones are situated not only at the source of the disturbance but also at varying distances from the disturbance source. The reflected signal is detected by each of the geophones and a recording of the intensity of the reflected signal versus time is made. Frequently, however, much of the data is obviously erroneous or incomplete. In such cases the data believed to be accurate is selected and additional data points are generated from this selected known data by linear interpolation.

Also, the data received at different geophones must be modified due to the fact that the propagation distance from a disturbance source down to a reflecting layer and then back up to a geophone located a distance from the source is obviously greater than the distance required for the signal to go straight down and then reflect straight back up to a geophone located at the source. In order to make a meaningful comparison of the data received at the two above-mentioned geophones it is necessary to bias the data received at one of the geophones so that the data received at both geophones have the same time reference.

In other cases it is not only desired to augment and modify incomplete test data, but also to add to such augmented and modified data some predetermined values, as for example quantities representing a curve which is compensatory to the curve represented by the data being generated.

The latter process is known as stacking. Thus, for example, in a curve represented by X and Y coordinates, the values of Y for certain values of X might have been obtained by testing. It is desired to generate additional values of Y, herein defined as $Y_i$, for additional values of X. Such additional data can be created by linear interpolation. Stacking can be accomplished by adding to each of the values of $Y_i$ some predetermined value $Y_e$, which can be compensatory in nature, to obtain a resultant Y value, herein defined as $Y_r$.

In the prior art, both linear interpolation and stacking have been accomplished with data processors by software. The use of software to perform interpolation and stacking however, has been relatively slow for reasons best understood from the following general outline of the process of linear interpolation.

In linear interpolation the known values of Y (the Y-array) are stored in main memory in terms of X, i.e., Y = F(X). Thus, the test might have produced N valid values of Y for N corresponding values of X, with the X values being addressed consecutively in main memory and each containing the value of the corresponding Y coordinate.

It is to be noted however that the distance between adjacent X points is not necessarily the same. For example, the time interval between adjacent X points $X_1$ and $X_2$ might be quite different from the time interval between adjacent X points $X_2$ and $X_3$. The three points $X_1$, $X_2$, and $X_3$ merely represent three valid X values and three valid corresponding Y values. If the time interval between $X_1$ and $X_2$ is greater than the time interval between $X_2$ and $X_3$ it would ordinarily be necessary to generate more values of Y between the known values of $X_1$ and $X_2$, than between the values $X_2$ and $X_3$.

It is to be understood that throughout this specification references to various X's, such as $X_1$, $X_2$ and $X_3$ refer to the main memory address in which is stored the value of Y corresponding to the referenced X. The programmer is aware of the different X axis distances between different adjacent X points and can write his interpolation program to provide the proper number of additional points between each pair of adjacent X points to produce a resultant curve having a linear X axis.

Thus, for example, it might be desirable to add six additional $Y_i$ values between $X_1$ and $X_2$ but only three additional $Y_i$ points between $X_2$ and $X_3$. To find the first of the six additional Yi values between $X_1$ and $X_2$ it is necessary to take the difference between $X_2$ and $X_1$, multiply such difference by a factor of 1/7, and then add $X_1$ to the resultant product. In a similar manner the remaining five points between $X_1$ and $X_2$ are determined by taking 2/7, 3/7, 4/7, 5/7 and 6/7 of the difference between $X_2$ and $X_1$, and adding each of the resultant products to $X_1$.

To obtain the additional three points between $X_2$ and $X_3$, the difference between $X_2$ and $X_3$ is multiplied by the fractions 1/4, 2/4, and 3/4, and the resultant products are then added to $X_2$.

In the foregoing general example it has been assumed that the originally obtained X and Y points are retained in the final array of points after the interpolation has been completed. In some cases, however, such originally obtained points are not retained in the final array of points, but are employed only to effect the interpolation function.

To provide the last mentioned feature a third array or block of data is employed which is known as the U array. The U array defines a series of pairs of points 1P and 2P, which are positioned contiguously along the X axis and which are indexed to the known X values. Also defined by the U array is a series of fractional quantities $\Delta P$, one each of which is associated with each pair of P points P1 and P2.

The P1 and P2 values are each comprised of an integer portion and a fractional portion F. The interger portion of P1 references a given X address $X_K$, where K is an integer equal to the integer portion of P1.

The general expression for calculating a value of $Y_i$ is as follows:

$$Y_i = {}_{XK} + F(X_{K+1} - X_K)$$

Assume that 1P = 8.4 and 2P = 9.3. Then the foregoing expression becomes $$Y_i = X_8 + 0.4(X_9 - X_8)$$

If $\Delta P = 0.5$ the second value of $Y_i$ would be in accordance with the following expression:

$$Y_i = X_8 + (0.4 + 0.5)\,(X_9 - X_8)$$
$$= X_8 + (0.9)\,(X_9 - X_8)$$

However if $\Delta P = 0.5$ is again added to F we would have the following expression:

$$Y_i = X_8 + 1.4(X_9 - X_8)$$

This expression is invalid since the fraction 1.4 is greater than unity. More specifically, $\Delta P$ has been added to 1P twice so that 1P has become equal to $8.4 + 0.5 + 0.5 = 9.4$, which is greater than 2P. 2P must always remain greater than 1P since 1P and 2P represent the two points in the X—Y coordinate system between which the new $Y_i$ values are being computed. The point 1P is selected to be near $X_K$ and the point 2P is selected to be near $X_{K+1}$.

Accordingly, when 1P becomes greater than 2P, new values of 1P, $\Delta P$ and 2P must be selected. One way to select such new values of 1P, $\Delta P$, and 2P is to make the old 2P into the new 1P and to then select a new $\Delta P$ and a new 2P from memory by means of the next two unused U values.

Furthermore when the integer portion of the updated 1P value increases by one, new $X_K$ and $X_{K+1}$ values must be accessed from memory. For example, in the case discussed above, when the integer value of 1P increased from 8 to 9 the new $X_K$ must be $X_9$ and the new $X_{K+1}$ must be $X_{10}$. It is possible to have a situation where the integer value of 1P increased by one but 1P did not yet exceed 2P. In such a case new values of $X_K$ and $X_{K+1}$ would be accessed even though the old values of 1P, $\Delta P$ and 2P would be used.

When using software to effect linear interpolation as known in the prior art, it was necessary to do the indexing and incrementing of X, Y and U arrays and of the P values in different time periods than those in which the calculations were done. This indexing, i.e., address generation, and calculations could not be done simultaneously since they both employed the arithmetic unit of the processor.

One broad application of linear interpolation in which the present invention is applicable is numerical integration of the following form:

$$C_1 + X_1 + C_2(X_2 - X_1)$$

where $X_1$ and $X_2$ and the constants $C_1$ and $C_2$ are all real numbers.

It is a primary object of the present invention to provide hardward means for carrying out a linear interpolation algorithm in which both the address generation for obtaining operands and the arithmetic calculations can be done simultaneously and substantially independent of each other, thus substantially decreasing the processor time required to effect linear interpolation and/or stacking.

BRIEF DESCRIPTION OF THE DRAWINGS

The above-mentioned and other objects and features of the invention will be more fully understood from the following detailed description thereof when read in conjunction with the drawings in which:

FIGS. 1 and 2 show the logic diagrams of the invention;

FIG. 2A shows how FIGS. 1 and 2 fit together;

Figure 2:
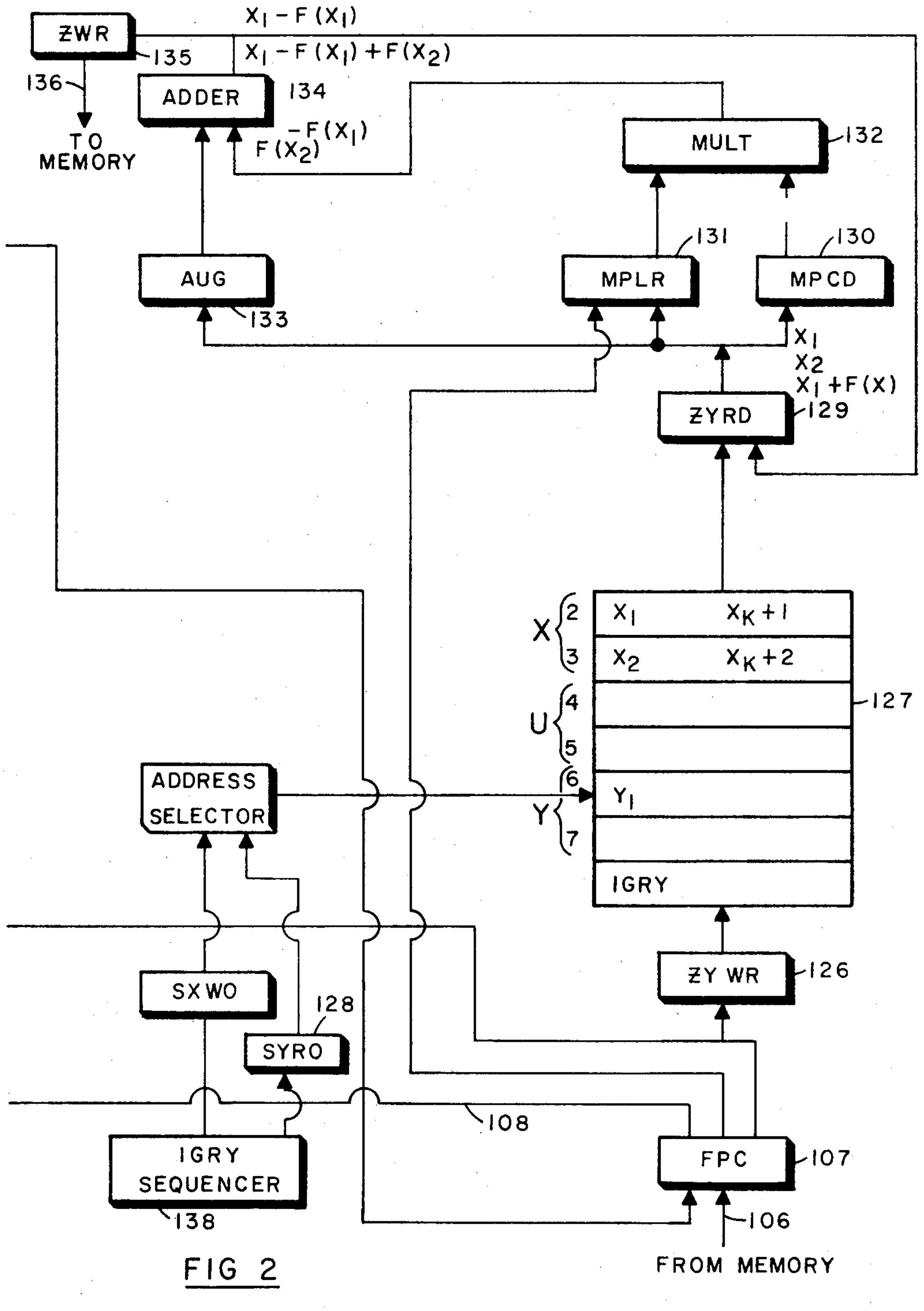

The specification is organized in the following manner:

I. GENERAL DESCRIPTION OF LOGIC
A. INDEXING AND INCREMENTING LOGIC
B. INITIATION OF IPN FUNCTION
C. DETERMINATION OF ABSOLUTE ADDRESSES OF X VALUES
D. THE SELECTION OF NEW P VALUES WHEN 2P < 1P
E. INDEXING AND INCREMENTING IN THE STACKING MODE
F. GENERAL RELATION OF INDEXING AND INCREMENTING TO COMPUTATION OF Y VALUES
II. TIMING DIAGRAMS OF FIGS. 5 – 8
A. TIMING DIAGRAMS RE INDEXING AND INCREMENTING
B. TIMING DIAGRAM OF FIGS. 5 – 8 RE STACKING MODE
III. COMPUTATION OF Y VALUES
A. COMPUTATION OF Y VALUES
B. COMPUTATION OF Y VALUES (STACKING MODE)
C. FLOW CHART OF INTERPOLATION ARITHMETIC INSTRUCTIONS.
IV. TYPICAL FORMAT FOR OCW WORDS

The following acronyms and definitions will be employed in the specification:

IPN—

The computer instruction that initiates the linear interpolation function.

OCW—

An operand control word which references an array of input data words to be read out of main memory. This array contains a specified number of elements or operands and specifically represents the X points in an X–Y coordinate array and contains the value of the Y coordinate for the given X coordinate.

$OCW_U$—

An operand control word which references an input data array of constant numbers required by the interpolation algorithm. More specifically, a U array contains an X point $X_K$ from which new $Y_i$ values are to be calculated, and also defines the fractional difference between $X_K$ and the next succeeding X point, $X_{K+1}$; which fractional difference is to be added to the referenced $X_K$ cumulatively to determine the points between $X_K$ and $X_{K+1}$.

$OCW_Y$—

The operand control word which references an array of data representing the final results of array processor operations to be written into main memory. $OCW_Y$ is employed when the stacking option is specified. In this case it serves both as an input and as an output operand control word at the same time. (The input array is written over after it is used.)

$X_{SA}$—

The starting address field of $OCW_X$ which specifies where the first data element (operand) for $OCW_X$ is located in main memory.

$X_1, X_2, X_3,–X_N$—

The X points data stored in the X array. The subscripts denote the order in which the points are stored. They do not necessarily indicate that each pair of adjacent X points are spaced an equal distance apart. The values contained in these X addresses are the Y values in an X–Y coordinate system corresponding to the X subscripts.

$U_{SA}$—

The starting address of the U array. The starting address is incremented by an index (usually by unity) upon each usage thereof, and is then stored in the $OCW_U$. It is used to reference the U array quantities 1P, ΔP and 2P.

1P, ΔP, 2P—

The quantities 1P, ΔP and 2P are contained in three consecutively accessed locations in the U array and define two points, 1P and 2P, between which points are to be calculated a number of additional points determined by the third quantity, ΔP. The quantity 1P contains an integer portion and a fractional portion, and is employed to compute the address of the $X_K$ and $X_{K+1}$ points. Further the integer part of 1P is equal to the subscript K of $X_K$. After each computation of the $X_K$ and $X_{K+1}$ addresses the quantity ΔP is added to 1P to create a new 1P which in turn is employed to calculate another pair of addresses in the X array. Such process continues until the new 1P exceeds or equals 2P, at which time 2P is caused to become the new 1P and two more U values are accessed from memory representing a new ΔP and a new 2P.

$X_A$—

Figure 8A:
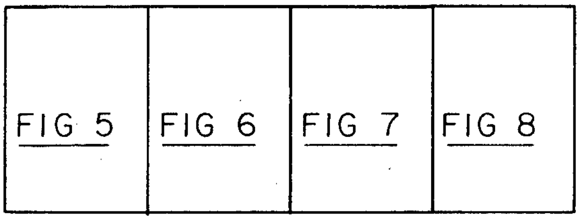
Figure 8:
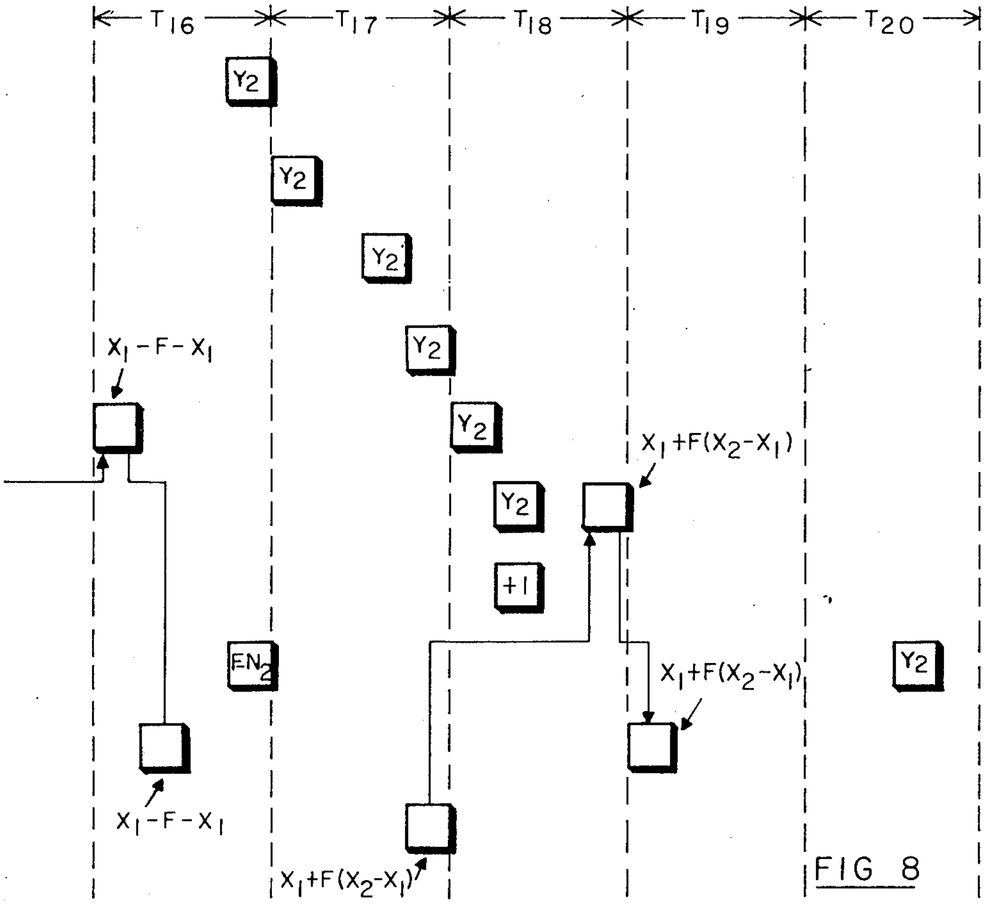

Represents any given address being used in a given computation as shown in timing chart of FIG. 8.

$Y_A$—

Represents any given Y address being utilized during a given computation as shown in the timing diagram of FIG. 8. $Y_A$ is a Y address as opposed to $Y_i$, Y or $Y_r$, which are values of Y.

$Y_C$—

Represents the count of Y. The count of Y is set at the beginning of the interpolate (IPN) instruction to a predetermined value. When the count $Y_C$ goes to zero the IPN operation is completed.

$Y_I$—

Represents the index of Y, that is the amount YSA is incremented each time the next Y address is to be accessed.

$U_c$—

Represents the count field of $OCW_U$. The $OCW_U$ count field is set at the beginning of the IPN instruction to a predetermined value, usually equal to the number of words making up the U-array. When the count $U_c$ goes to zero, the IPN operation is completed. It is to be noted that when both a U count and a Y count appear in the IPN operation, the said IPN operation will be completed when the first count (either $U_C$ or $Y_C$) goes to zero.

$Y_1$, $Y_2$, $Y_3$,–$Y_i$—

The computed values of Y in the expression $Y_i = X_K + F(X_{K+1} - X_K)$ $Y_b$—

A biasing or compensatory value of Y to be added to the computed value $Y_i$.

$Y_r$—

The resultant value of Y in the expression $Y_r = Y_i + X_K + F(X_{K+1} - X_K)$

F—

Represents the lower half or the fractional part of 1P. As discussed above F can change as ΔP is added to 1P after each computation of a new point.

I. GENERAL DESCRIPTION OF LOGIC

A. INDEXING AND INCREMENTING LOGIC

The indexing function (as distinguished from the arithmetic function) is formed by the logic shown in FIG. 1. The integrated general register 101 (IGRX) is a storage means utilized to receive and store the six OCW words in addresses 32 through 37 and the instruction jump address word in address 31. These seven words in IGRX 101 are used to access the three data arrays, namely, the X, U and Y arrays.

The 1GRX sequencer 100 is an unalterable control network constructed to execute a predetermined series of commands once the IPN instruction has been initiated. These commands from the IGRX sequencer 100 in essence control the flow of words from and into the IGRX 101 through the various registers and gates shown in FIG. 1.

More specifically, words being routed into the IGRX are written therein from the ZX write register 104 into the correct IGRX 101 address as defined by a tag on the word which tag is interpreted to cause the correct address to be placed in SXWO register 102.

Words read from the IGRX 101 are gated into the ZX read register 111. The address to be read is determined by the contents of the SXRO register which gets its information from the sequencer 100. A tag is attached to the word read from the IGRX 101 and placed in the tag block 111. This tag identifies the particular address in the buffer storage IGRX 101 from which the word was read, as for example, one of the addresses 31 through 37.

From the read register 111 the word can be routed either to the data address increment register 113 or to the data address register 114. The latter register 114 has a tag block 115 attached thereto so that the originating address of the word is carried along and remains associated with the word in the data address register 114 and also in the data address increment register 113.

As will be seen later from a description of the operation of the structure there are occasions when it is desired to add two quantities together to form a desired result. For example, it is necessary to add ΔP to 1P as discussed above. Also, it is necessary to add $X_{SA}$, starting address of X to 1P as part of the address generation (indexing) required to obtain $X_K$ and $X_{K+1}$.

Thus, to perform the above-mentioned functions, and other addition functions necessary to the addressing of the X array values and the U array values, both register 113 and register 114 are utilized and the contents thereof added together in adder 120. The resultant sum is often supplied back to the IGRX buffer memory locations through the ZX write register 104. Specifically, the tag in 115 is combined in SXWO register 102 with control signals from IGRX sequencer 100 to insure that the word in ZXWR 104 will be written at the desired address in IGRX 101.

B. INITIATION OF IPN FUNCTION

A brief summary of the steps involved in initiating operation of the IPN function and the addressing of the various values in the X, U and Y arrays will be set forth.

The processor employed in the present system is an array processor that does not run by a strict series of linked timing chains but instead is coupled to a general purpose digital computer like any other type of peripheral equipment. Each small section of the processor runs at its own rate, which is as fast as possible. This means that each register such as registers 111, 113 and 114 are loaded as soon as they become empty (previous data having been transferred to the next stage) and when the preceding stage has data ready to be transferred therein.

The interpolation function is initiated by a START external function word (EFW) which contains the address of the first instruction, completion of the previous instruction, in the case of the start EFW. The P register 123 is loaded from the I/O lines of the general purpose digital computer to which the array processor is associated. The machine is now ready to execute an instruction. The first commands from the IGRX sequencer 100 are to Read P. This results in seven addresses being generated, as a function of the P register, and sent to memory. The single instruction and the six OCW words obtained from memory are loaded into IGRX 101 at addresses 31 through 37, respectively.

The next command in the sequencer 100 in FIG. 1 functions to bring out to the ZX read register 111 the $OCW_U$ word in address 35 of IGRX 101, which word contains the count field for the U array. The U array count has been predetermined and will be decremented by 1 for each new U value acquired until the count reaches zero, which indicates the end of the interpolation function. Decrementing of the $OCW_U$ count field is accomplished by placing the count of U in data address 114 and a minus 1 in data address increment register 113. The two quantities are added together in adder 120 wherein the count of U is decremented by 1. The decremented count is then placed back into address 35 of IGRX 101.

It is to be noted that as soon as $OCW_U$ from address 35 has left the read register 111 and passed to data address register 114 the sequencer 100 caused the second $OCW_U$ word from address 34 of IGRX 101 to be read out into ZX read register 111. This second $OCW_U$ word is then transferred to data address register 114, with the tag thereof being transferred to tag block 115, but after the decremented U count is gated to the ZXWR register 104.

Each time the U array is referenced (to fetch 1P, ΔP, 2P or ΔP, 2P) the index is added to the starting address and the sum replaces the former starting address. The value of such index is self-contained in $OCW_U$ and is supplied to the data address increment register 113 following the time that the U array address is transferred to the data address register 114. The aforementioned two quantities are then added together in adder 120 and the resultant U array address is supplied to the addressing section 121 and then to main memory to fetch the specified U value. The updated U array address is also supplied via lead 122 back to ZXWR 104 and from there into address 34 of IGRX 101.

During this part of the IPN operation the sequencer will command the fetching of three consecutive U values, including the U value at the starting address and the next two occurring U values. The elements of the U array designated 1P, ΔP and 2P, and are placed in addresses 1, 3 and 2 respectively, of IGRX register 101, as shown in FIG. 1.

Figure 3:
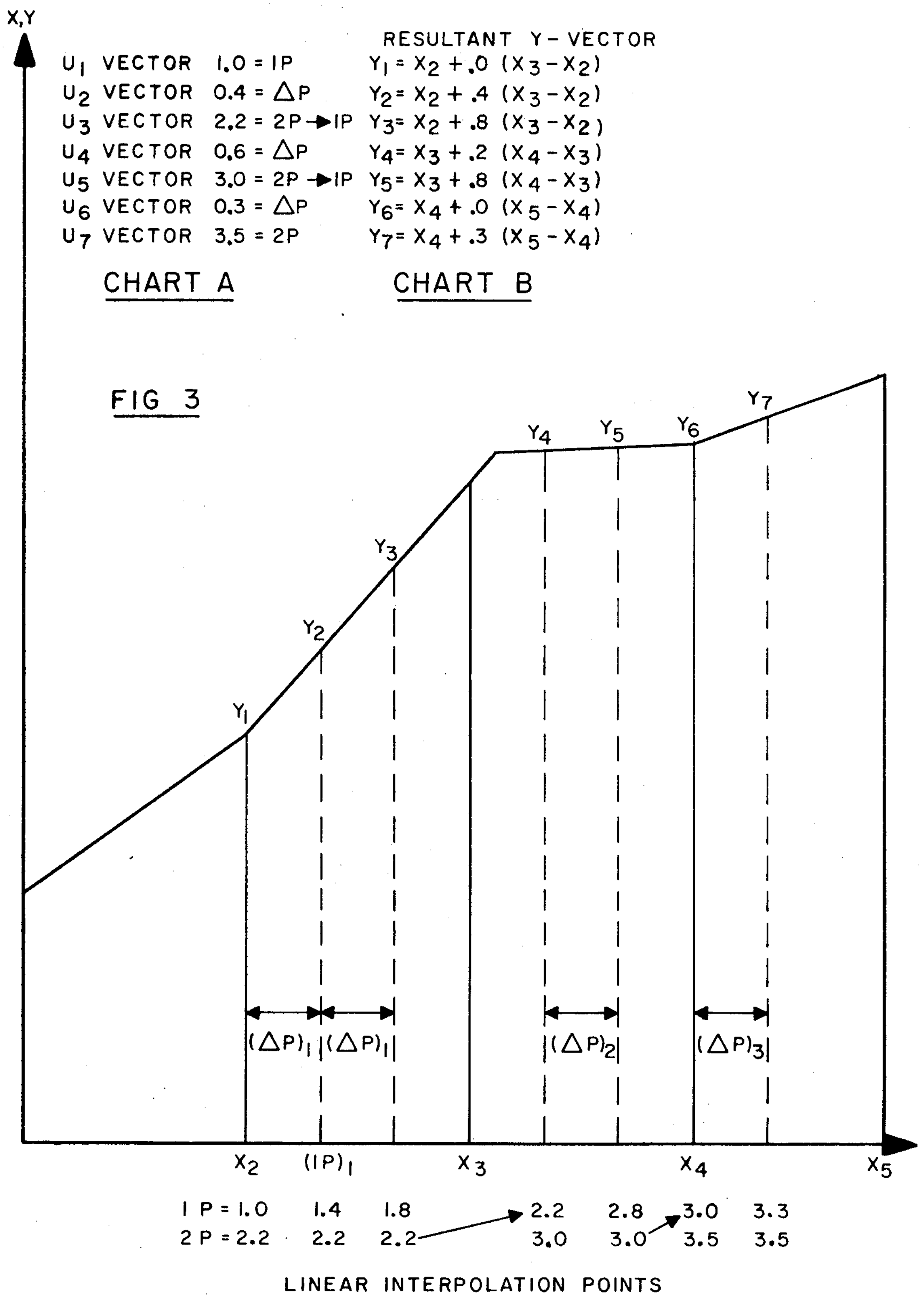
FIG. 3 is a curve illustrating a simple example of how linear interpolation is effected and how the U, X and Y arrays and the P values are employed.

In order to obtain a better understanding of the nature of the values 1P, ΔP and 2P, reference is made to the curve of FIG. 3 wherein there are shown four known X points $X_2$, $X_3$, $X_4$ and $X_5$. It is to be understood that the Y values for each of these known X points are also known and, in fact, constitute the contents of the words in the addresses defined by the X subscripts. Values of 1P, ΔP and 2P have been arbitrarily selected and are shown in chart A as being equal to 1.0, 0.4 and 2.2, respectively. Such values of 1P, ΔP and 2P were contained in the U-array, namely $U_1$, $U_2$, and $U_3$, respectively.

As discussed above, the integer parts of 1P and 2P point to the subscripts of the X array and represent points along the X axis referenced to said associated X points. For reasons that will be discussed in more detail later, the integer of each 1P and 2P value always refer to the X point whose subscript is one greater than said integer. Thus in chart A the $U_1$ value has a value of 1.0, which value is defined as 1P. The "1" in the 1.0 refers to the $X_2$ point in the curve of FIG. 3. Since the fractional portion of 1P is zero the location of 1P on the curve of FIG. 3 is coincident with $X_2$.

The third U value, which represents 2P, has a value of 2.2. The whole number 2 refers to the point $X_3$ in the curve of FIG. 3. The use of the third U value however has a fractional portion of 0.2. (The fractional part 0.2 of 2P is used in the test, "Is 1P < 2P," which will be discussed in more detail below.)

It is now desired to compute two additional points between 1P and 2P in ΔP increments and using the known values of Y corresponding to the $X_2$ and $X_3$ values.

However, before any such calculations can be done it is necessary for the logic to compare the value of 1P with that of 2P to determine if 2P is greater than 1P. If 2P is not greater than 1P then new values of 1P, ΔP and 2P must be selected. The manner in which such new values of P are selected will be described later.

For the present discussion, assume that 2P is greater than 1P. (In the example in chart A of FIG. 3 2.2 > 1.0.)

The value of $Y_i$ is then computed in accordance with the top expression in chart B of FIG. 3 which is as follows:

$$Y_i = X_2 + 0.0(X_3 - X_2)$$

It can be seen that since the fractional portion of the U1 value is zero, Y is equal to $X_2$, as shown in the above expression.

The means by which the addresses of $X_2$ and $X_3$ are determined and accessed from main memory and by which the computations required by the expressions of chart B of FIG. 3 are accomplished, have not yet been discussed. Such accessing and computations will be discussed later in connection with the arithmetic portion of the logic shown in FIG. 2. For the present discussion assume that such computations are in fact made.

In order to compute the value of $Y_2$ a new 1P value must be obtained. The new 1P value will be denoted herein as $1P_1$ and is created by adding ΔP to the old value of 1P. It can be seen from chart A that ΔP is obtained from the U2 array and has a value of 0.4 which, when added to the old 1P of 1.0, creates a new $1P_1$ value equal to 1.4. The integer portion of the new 1P is a "1" and again points to $X_2$. The fractional portion of the new $1P_1$ value is 0.4 which is employed in the second expression in chart B; said second expression being as follows:

$$Y_2 = X_2 + 0.4(X_3 - X_2)$$

Referring back to FIG. 1 the specific logic means by which the new $1P_1$ value is determined will be discussed as well as the logic which was used determining whether 1P was less than 2P.

The original 1P value was placed in the data address register 114 with the whole number 1 being placed in the upper eighteen bits of register 114 and the fractional portion, which was a zero, being placed in the lower eighteen bits of register 114. The complement of the 2P value is placed in the data address increment register 113. Then the complement of 2P is added to 1P plus 1 in the adder 120. The result thereof is tested. If it is positive it indicates that 1P is greater or equal to 2P, and new values of 1P, ΔP and 2P must be selected.

Assume, however, that it is determined that 2P is still greater than 1P. At this time and before the computation for $Y_1$ is made, the value of the new $1P_1$ is determined and stored back in IGRX 101 in address 1. Such new value of $1P_1$ is effected by the sequencer transferring ΔP from IGRX 101 into the data address increment register 113. The value of 1P is still stored in data address register 114. The two quantities in registers 113 and 114 are added in adder 120 to form the new 1P1 which is then transferred from adder 120 into ZXWR 104 and then back into address 1 of IGRX 101. It is to be noted that the original 1P is still stored in data address register 114 and is then subsequently used in the determination of the $X_2$ and $X_3$ addresses in main memory and which are utilized in the determination of $Y_1$.

Figure 4:
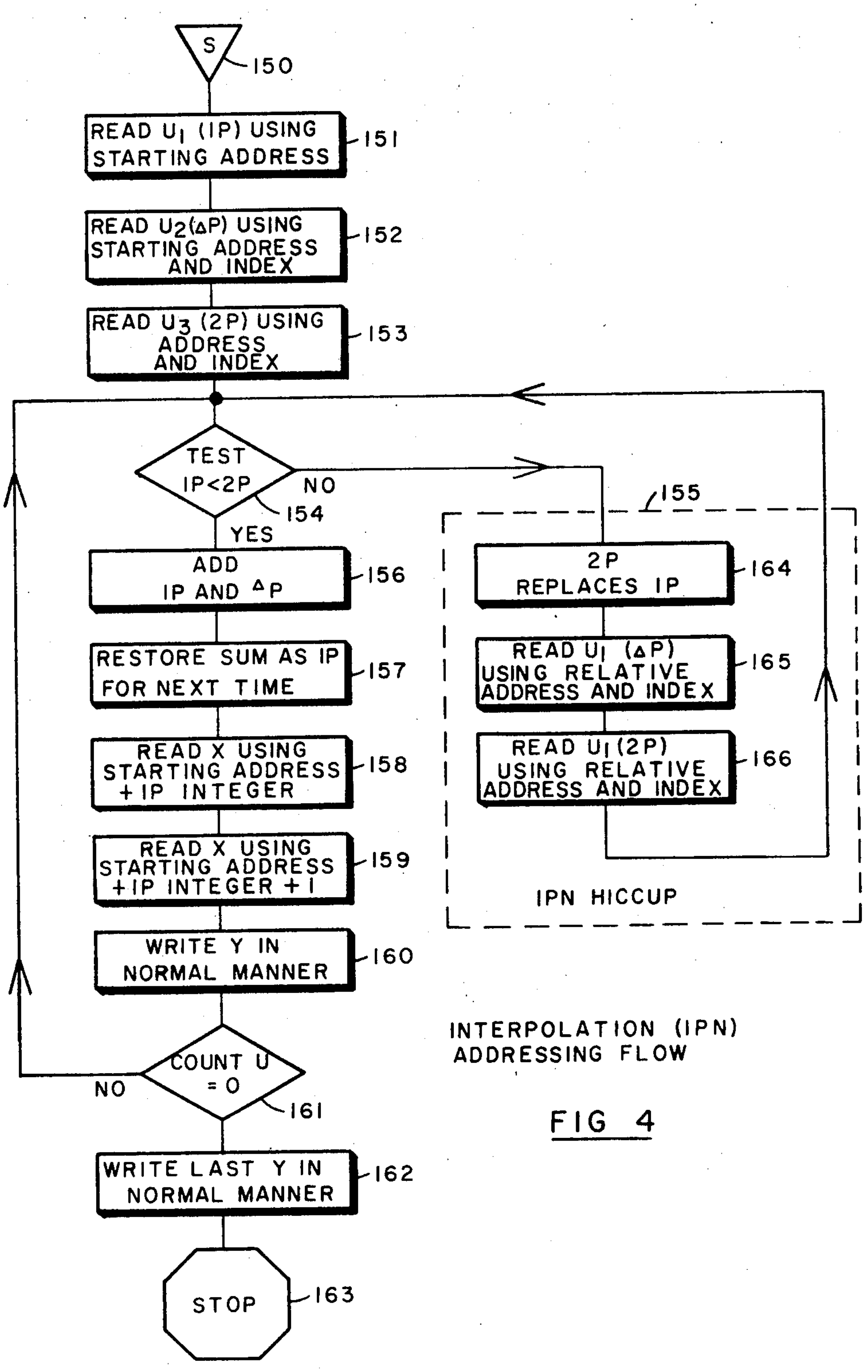
FIG. 4 is a flow chart of the interpolation addressing steps.

A flow chart of the logic steps so far discussed is shown in FIG. 4. More specifically, the blocks 151, 152 and 153 represent the reading of the three values of 1P, ΔP and 2P into the IGRX 101 of FIG. 1 after the IPN sequence is started by start block 150 (FIG. 4). The testing of whether IP<2P is shown in block 154 followed by the adding of 1P and ΔP in block 156 and the restoring of the resultant sum back into the IGRX 101 of FIG. 1 as the new 1P for the next calculation. The next steps in the operation are the reading of $X_2$ and $X_3$ as shown in blocks 158 and 159 of FIG. 4. The logic means by which the addresses of X are obtained will be discussed below.

C. DETERMINATION OF ABSOLUTE ADDRESSES OF X ARRAY VALUES

The $X_2$ address is determined in the following manner. The starting address $X_{SA}$ of the X array is contained in the operand control word $OCW_X$ contained in address 32 of IGRx 101 in FIG. 1. The sequencer 100 orders $X_{SA}$ of $OCW_X$ up into the data address increment register 113. The original 1P is still stored in the data address register 114. The integer part of 1P, which is a 1, is added to the $X_{SA}$ in adder 120 and then supplied to the addressing section 121 which forms the absolute address of $X_2$ and then supplies such absolute address to the memory access circuit. The word stored at address $X_2$ is supplied from memory through a floating point converter circuit 107 and then through the ZY write register 126 and into a predetermined address of IGRY storage register 127 in FIG. 2.

Later, at the proper time and under control of the IGRY sequencer 138, the value originally stored at $X_2$ will be transferred out of the IGRY register 127 and utilized in the computations required in chart B of FIG. 3.

It is next necessary to access address $X_3$ and bring the value stored at $X_3$ from main memory into IGRY register 127. To access $X_3$ the logic of FIG. 1 must go through the following operational steps. The computed value of $X_{SA} + P$ appearing at the output of adder 120 is not only supplied to addressing section 121 but is also supplied back through lead 122 to register 104 and then to data address register 114. At the same time a "1" is placed in the data address increment register 113. The contents of registers 113 and 114 are then added in adder 120 to produce a quantity $(X_{SA} + P + 1)$ which is supplied to addressing section 121 where the absolute address $X_3$ is determined and supplied to the memory accessing logic. The value stored at $X_3$ is thus obtained from memory and supplied through the floating point converter 107, the write register 126 and then into a predetermined address of IGRY register 127 under control of the IGRY sequencer 128.

With both the $X_2$ and $X_3$ values stored in IGRY 127 the IGRY sequencer 138 will then initiate the computations in the arithmetic unit of FIG. 2 as called for in Chart B of FIG. 3. It is to be noted that the fractional portion of 1P is also in the arithmetic portion of the processor at this time.

D. THE SELECTION OF NEW P VALUES WHEN 2P< 1P

When 2P becomes less than 1P it becomes necessary to choose a new 1P, a new 2P and a new ΔP. Specifically what occurs is that the old 2P, which has a value of 2.2 in the example discussed above, becomes the new 1P, and the new ΔP and 2P are obtained from the next two U array values U4 and U5, as shown in chart A of FIG. 3. The new 2P value is 3.0 and the new ΔP has a value of 0.6. The flow chart for obtaining the new U value is shown in FIG. 4 within the dotted block 155. More specifically, when the test of whether 1P is less than 2P is made as shown in step 154 and when said test shows that 1P is greater than or equal to 2P, then the logic will perform the steps shown in 155, wherein 2P replaces 1P and two new U array values are read from main memory, as shown in steps 165 and 166.

Under the guidance of the IGRX sequencer 100 of FIG. 1 the old 2P value is transferred from address 2 of IGRX 101 up to the data address register 114 with a 1P tag attached thereto. This new 1P value will remain in register 114 until the new ΔP is fetched 1P main memory at which time said new ΔP will be added to the new 1P to form the quantity as then stored back in address 1 of IGRX 101. However, the new 1P remains in register 114 to be used in the computation of the first $Y_i$ value with the new P values. Also at this time the sequencer 100 of FIG. 1 causes the new ΔP and the new 2P values obtained from main memory to be stored in addresses 3 and 2, respectively, of IGRX 101. Upon completion of the entry of the new P values into IGRX 101 of FIG. 1, 2P and 1P are tested to determine if 2P is greater than 1P as shown in step 154 of FIG. 4. If 2P exceeds 1P then the operation continues through the logic steps 156 through 161 of FIG. 4.

Referring to FIG. 3 it can be seen that the points $Y_4$ and $Y_5$ are calculated from the newly selected values of 1P, ΔP and 2P. From chart A it can be seen that the ΔP value of 0.6 can be added to the 1P value of 2.2 only once before exceeding the 2P value of 3.0. Thus, in order to determine the values $Y_6$ and $Y_7$ it is again necessary to read up new values of 1P, ΔP and 2P. More specifically, the old value of 2P = 3.0 is caused to become the new 1P. Two additional U array values $U_6$ and $U_7$, as shown in chart A, are accessed in main memory under the direction of sequencer 100 of FIG. 1, and the new values of ΔP and 2P obtained therefrom are inserted in addresses 3 and 2 of IGRX 101 in preparation for the determination of the final two points, $Y_6$ and $Y_7$.

Each time a new U array values is fetched from main memory the count of U is decremented by 1 as discussed hereinbefore. When the count field of $OCW_U$ becomes equal to zero, as indicated in step 161 of FIG. 4, the last computed $Y_i$ value is written in the normal manner in the address allocated thereto in main memory and the instruction comes to a stop, as shown in step 163. Until the count of U (or the count of Y) becomes equal to zero however, the operation is looped back from step 161 to step 154 in FIG. 4 and a magnitude comparison test is made of the then existing 1P and 2P values.

E. INDEXING AND INCREMENTING IN THE STACKING MODE

Up to this point in the specification no detailed discussion of stacking has beem made. If stacking is desired then the two $OCW_Y$ words in addresses 36 and 37 of IGRX 101 of FIG. 1 are utilized. More specifically, the $OCW_Y$ word in address 37 contains a predetermined count of the desired number of Y words in the Y array. In the example discussed above, and shown in FIG. 3, the count of Y is 7 since there are seven $Y_i$ 's to be computed. The $OCW_Y$ word in address 36 of IGRX 101 contains the starting address of Y in main memory.

As discussed generally above stacking involves the addition of some predetermined value $Y_e$ to each value of the computed $Y_i$. Thus, for example upon the completion of computation of the $Y_i$ value in chart B of FIG. 3, it is necessary for the IGRX sequencer 100 to command the $OCW_Y$ word in address 36 of sequencer 101 to go out to the main memory and fetch the contents of $Y_{SA}$. This word is brought back from main memory to the floating point converter 107 of FIG. 2 and then through ZY write register 126 and into a predetermined address 6 of IGRY register 127 as shown in FIG. 2. The count field of $OCW_Y$ contained in address 37 of IGRX 101 (FIG. 1) is decremented each time a word in a Y address is accessed from main memory. When the count field of $OCW_Y$ reaches zero the program is completed. It was mentioned above that when the count field of the $OCW_U$ word reaches zero, the program was also completed. In point of fact it is the programmer's choice to have the program end when either the Y count or the U count reaches zero.

The decrementing of the Y count is effected in much the same way as the decrementing of the U count. Specifically, the Y count field is transferred from the IGRX register 101 of FIG. 1 into the data address register 114, and a minus 1 is entered into the data address increment register 113, both under the control of the IGRX sequencer 100. The quantities in registers 113 and 114 are added in adder 120 and the resultant decremented count is transferred back into IGRX 101 via lead 122 and through the logic block 104.

F. GENERAL RELATION OF INDEXING AND INCREMENTING TO COMPUTATION OF Y VALUES

The arithmentic portion of the IPN instruction as it relates generally to indexing and incrementing will now be discussed.

Assume that the address for $X_1$, $X_2$ (and Y if "stacking" is specified) have been generated and sent to main memory. The memory responds with the contents of those addresses. The actual values $X_1$, $X_2$ (and Y if stacking is specified) enter the processor and are stored in a buffer IGRY 127 at addresses 2, 3 and 6 respectively. As discussed above, the words at addresses $X_1$ and $X_2$ were obtained through the use of the integer portion of the first 1P value and the starting address of X identified herein as $X_{SA}$. The word at $Y_A$ was obtained from the starting address $Y_{SA}$ in the $OCW_Y$ word in address 36 of IGRX 101.

The fractional portion of 1P is also needed in order to perform the computation shown in chart A of FIG. 3. It can be seen that the fractional portion of the first P value is a zero. Such zero value is transferred from the data address register 114 through the floating point converter 107 and then into the multiplier 131 of FIG. 2. Such transfer occurs as indicated by the blocks labeled F in the time intervals $T_1$ and $T_2$ of the timing chart of FIG. 5; the F standing for the fractional portion of 1P.

All of the elements required to perform the arithmetic operations to compute the values of $Y_i$ of chart B are now present in the arithmetic section of the structure of FIG. 2. However, before discussing in detail such arithmetic operation a brief description of the timing chart of FIG. 5 – 8 will be discussed since it will be referenced frequently in connection with the arithmetic operations to be performed.

II. TIMING DIAGRAMS OF FIGS. 5 – 8

A. TIMING DIAGRAMS RE INDEXING AND INCREMENTING

In FIGS. 5, 6, 7 and 8 there is shown a complete cycle of operation of the entire system including the addressing function as well as the arithmetic function. There is also shown a part of a second cycle of operation.

Figure 5:
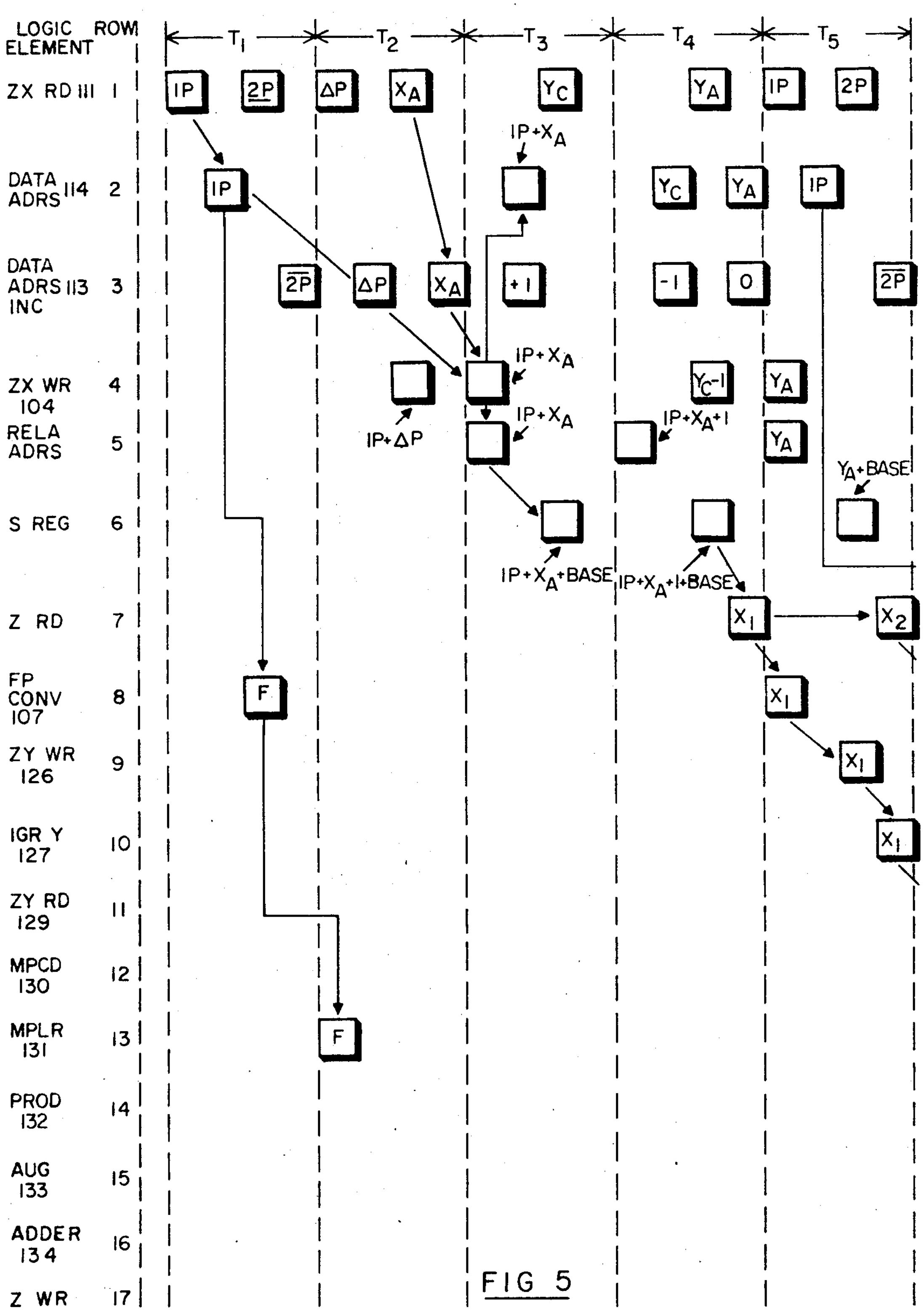
FIGS. 5, 6, 7 and 8 form a timing diagram of the steps of the operation of the structure of FIGS. 1 and 2.

In the column at the left in FIG. 5 is listed the various logic blocks shown in FIGS. 1 and 2. There are 17 of such logic blocks listed to form 17 rows in the timing diagram. The diagram of FIGS. 5 – 9 are further divided into 20 columns labeled $T_1 - T_{20}$. During each interval of time several steps in the operation will occur. The occurrence of each operational step is defined by a block which is positioned with respect to the listed logic elements at the left of FIG. 5 to show the logic element involved, and in a particular column to show the time and the sequence that such operational steps occurred.

As an example, consider the first block appearing at the upper lefthand corner of FIG. 5 of the timing diagram. This block is labeled 1P and is in the row corresponding to the ZX read register 111. This means that during time interval $T_1$ 1P is transferred from the IGRX register 101 into the ZX read register 111. One clock cycle interval later this same 1P value is transferred from the ZX read register 111 to the data address register 114 (FIG. 1) as indicated by the presence of the block labeled 1P in row 2 of FIG. 5. It is assumed in the diagram of FIGS. 5–8 that the initial 1P, 2P and ΔP values have been previously loaded into the IGRX register 101.

The determination of the $X_1$ and $X_2$ addresses and ultimate storage thereof in IGRY 127 of FIG. 2 can be traced back from the block labeled $X_A$ in row 1 during time $T_2$ down through row 3 in time interval $T_2$ to row 4 during time $T_3$, where it is then combined with 1P.

The sum of $1P + X_A$ is then passed through the relative address of row 5 and into the S register of row 6, at which time the base address has been added thereto to form the absolute address $X_1$ to send to memory. The address $X_1$ as shown in time interval $T_4$ in row 7 can be traced down through rows 8, 9, 10 and into row 10, indicating storage in the IGRY register 127 of FIG. 2.

For a detailed description of base relative addressing, reference is made to U. S. Pat. No. 3,461,433 issued Aug. 12, 1969 to W. C. Emerson and entitled "Relative Addressing System For Memories" and which is incorporated herein by reference.

In a similar manner the word in address $X_2$ is obtained and stored in the IGRY register 127 of FIG. 2. More specifically, after the formation of the quantity $1P + X_A$ as shown in time interval $T_3$, row 4, in FIG. 5, the quantity 1 is added thereto as shown in row 5, time interval $T_4$, to form the quantity $1P + X_A + 1$. A base valve is added to such quantity in row 6, time $T_5$, to form the address $X_2$, which is shown in row 7, time interval $T_5$. The address $X_2$ can be traced down through rows 8 and 9 and into the IGRY register as indicated in row 10, time $T_6$.

B. TIMING DIAGRAM OF FIGS. 5 – 8 RE STACKING MODE

The timing diagram of FIGS. 5 – 8 shows the stacking mode of operation. Accordingly, the $OCW_Y$ words in addresses 36 and 37 of IGRX 101 are employed.

In FIG. 5 the count of Y, shown in block $Y_C$, can be seen to be in the ZX read register at time $T_3$, row 1. $Y_C$ can be traced into the row 2 at time $T_4$, and then added to the minus 1 shown in the block immediately therebelow in time $T_4$, row 3, to produce the decremented count $Y_C - 1$ which is transferred to the ZX write register 104 as shown in row 4, time $T_4$. This decremented count $Y_C - 1$ is then placed back in address 37 of IGRX 101 of FIG. 1.

Next, the starting address of Y is obtained from the $OCW_Y$ word in address 36 of IGRX 101 and placed in the ZX read register 111 as shown by block $Y_A$ at time $T_4$ in row 1. $Y_A$ can be traced down into row 2 in time $T_4$. $Y_A$ is then added to a zero as shown in row 3, time $T_4$. The zero is added to $Y_A$ since on the first computation it is desired to access the starting address of Y and not a subsequent address of Y. $Y_A$ can next be traced to row 4, time $T_5$, and then to rows 4 and 5, at time $T_5$. Next, the address base is added to $Y_A$ in row 6, time $T_5$ to form the $Y_1$ address shown in time $T_6$, row 7. At this time the $Y_1$ word is in the Z read register in FIG. 1. This $Y_1$ word can be then traced through rows 8, 9 and 10 in time $T_7$ . The block $Y_1$ in row 10 shows that $Y_1$ is stored in IGRY 127 of FIG. 2.

III. COMPUTATION OF Y VALUES

A. COMPUTATION OF $Y_i$ VALUES

At this point in the discussion of the operation of the system with reference to the timing diagram of FIGS. 5 – 9 all of the values necessary to make the computation are in the arithmetic section of FIG. 2. More specifically the fraction F is in the multiplier 131 and the $X_1$, $X_2$ and $Y_1$ values are all in the IGRY register 127. At time $T_6$, row 11, $X_1$ is transferred from the IGRY register 127 to the ZY read register 129 under control of IGRY sequencer 138, and thence to the multiplicand register 130. $X_1$ is also transferred to augend register 133 of FIG. 2, as shown in row 15, time $T_6$ in FIG. 5. Since both the multiplier 131 and the multiplicand 130 now contain quantities, multiplication is initiated between such quantities in multiplier 132 to produce the product of F and $X_1$. During this multiplication operation the polarity sign is changed from positive to negative by virtue of a command from IGRY sequencer 138. Thus, the output of the multiplier 132 is $(-F)(X_1)$. This quantity $-F \cdot X_1$ is added to the $X_1$ previously supplied to augend register 133 to produce the following quantity:

$$X_1 - F(X_1)$$

This last-mentioned quantity is not supplied to the Z write register 135 because of the tag which goes along with the data in the adder 134. Such tag directs a transfer to 129 rather than 135 from the transfer of said last-mentioned quantity to the ZY read register of FIG. 2 rather than to the Z write register 135.

Figure 6:
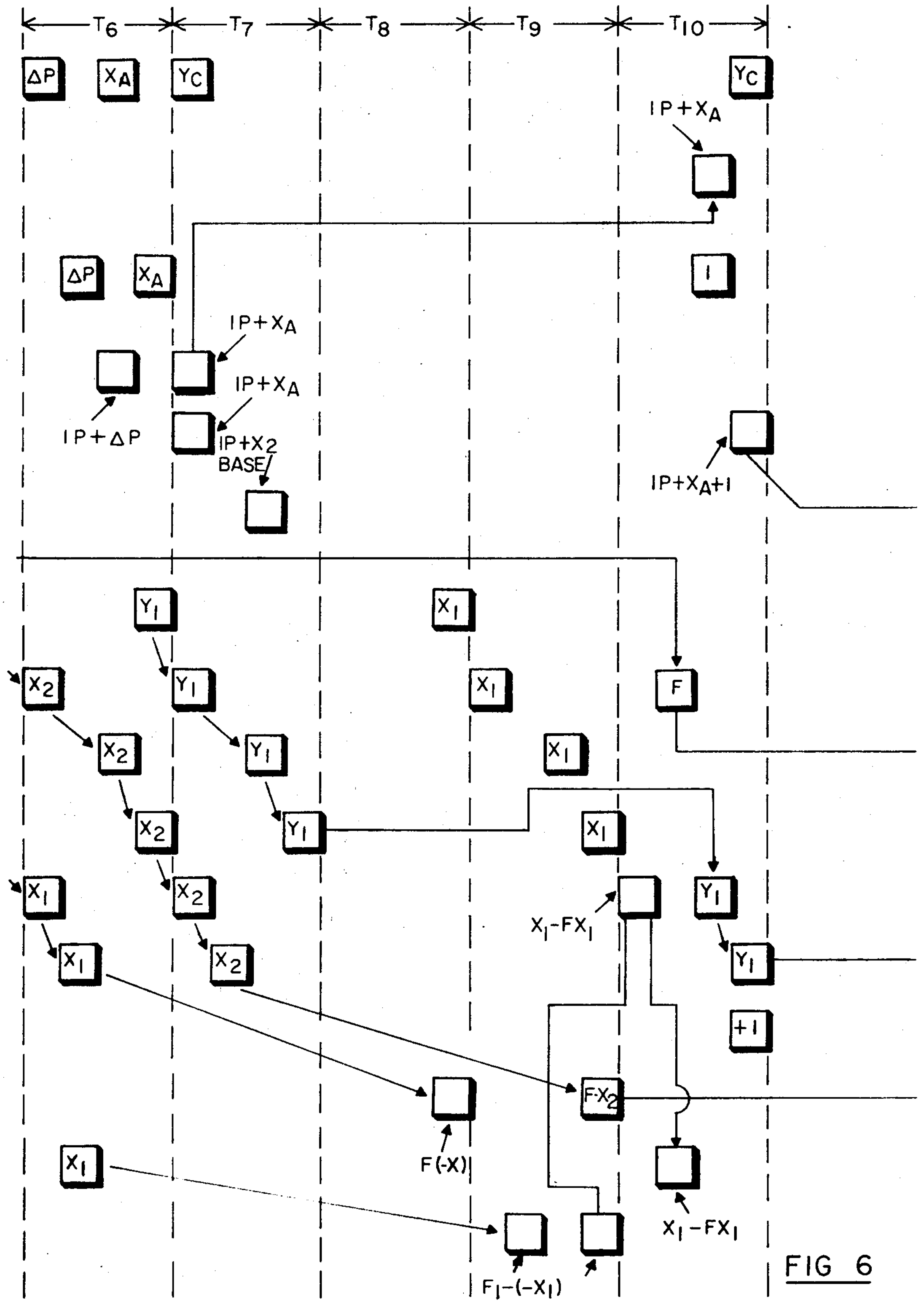

The foregoing computation is shown in the timing diagram of FIGS. 5 and 6 beginning with the block marked $X_1$ in time $T_6$, row 11. The sign of $X_1$ is changed as it is placed in the multiplicand as shown in row 12, time $T_6$.

The resultant product of F and $-X_1$ is shown at time $T_8$, row 14, which product is then added to X. $X_1$ has been placed in the augend register at time $T_6$, row 15. The resultant normalized sum shown at time $T_9$, row 16, is as follows:

$$X_1 - FX_1$$

This sum is then transferred to the ZY read register 129 and then to the augend register 133 as shown at time $T_{10}$, row 11 and time $T_{10}$, row 15 in FIG. 6.

Referring back to the diagram of FIG. 2 the $X_2$ is next brought out of IGRY register 127 into the multiplicand register 130. The multiplier register 131 still contains the F quantity. Multiplication of the quantities in the registers 131 and 130 then occurs in the multiplier 132 to produce the result $F \cdot X_2$, which result is then added to the quantity stored in augend 133, thus producing the following quantity:

$$Y_i = X_1 + F(X_2 - X_1)$$

Referring to FIG. 6 the foregoing computations are shown as follows in the timing chart. The passing of $X_2$ from the IGRX register through the ZY read register and into the multiplicand 130 of FIG. 2 is represented by the blocks marked $X_2$ at time $T_7$, rows 11 and 12 of FIG. 6. The product $F \cdot X_2$ is shown as occurring at time $T_9$, row 14, said product is then added to the quantity $X_1 - FX_1$ stored in augend 133 of FIG. 2 to produce the result shown in the time frame $T_{11}$, row 16.

B. COMPUTATION OF $Y_r$ VALUES (STACKING MODE)

At this point the value of $Y_i$ has been calculated and in the nonstacking mode of operation such value $Y_1$ would then be transferred directly to the main core storage as a completed operation.

However, in the stacking mode of operation which is shown in FIGS. 5 – 8 some known bias valve, $Y_b$, is to be added to the computed $Y_i$. This known value $Y_b$ is the $Y_1$ shown in block $Y_1$ in time frame $T_7$, row 10, which represents the IGRY register 127 of FIG. 2. The aforementioned $Y_1$ value is then transferred under control of the IGRY sequencer 138 in FIG. 2 to the ZY read register 129 and then to the multiplicand register 130 of FIG. 2 as shown by the two $Y_1$ blocks at time $T_{10}$, rows 11 and 12, of FIG. 7.

The $Y_1$ word is next multiplied by a factor of 1 which has been placed in the multiplier 131 in FIG. 2 to produce an output product of $Y_1$. The multiplication of $Y_1$ by unity is necessary in order to pass the value $Y_1$ through the particular logic available in FIG. 2. Thus, the value $Y_1$ appears at the output of multiplier 132 in FIG. 2 as shown by $Y_1$ at time $T_{13}$, row 14.

Figure 7:
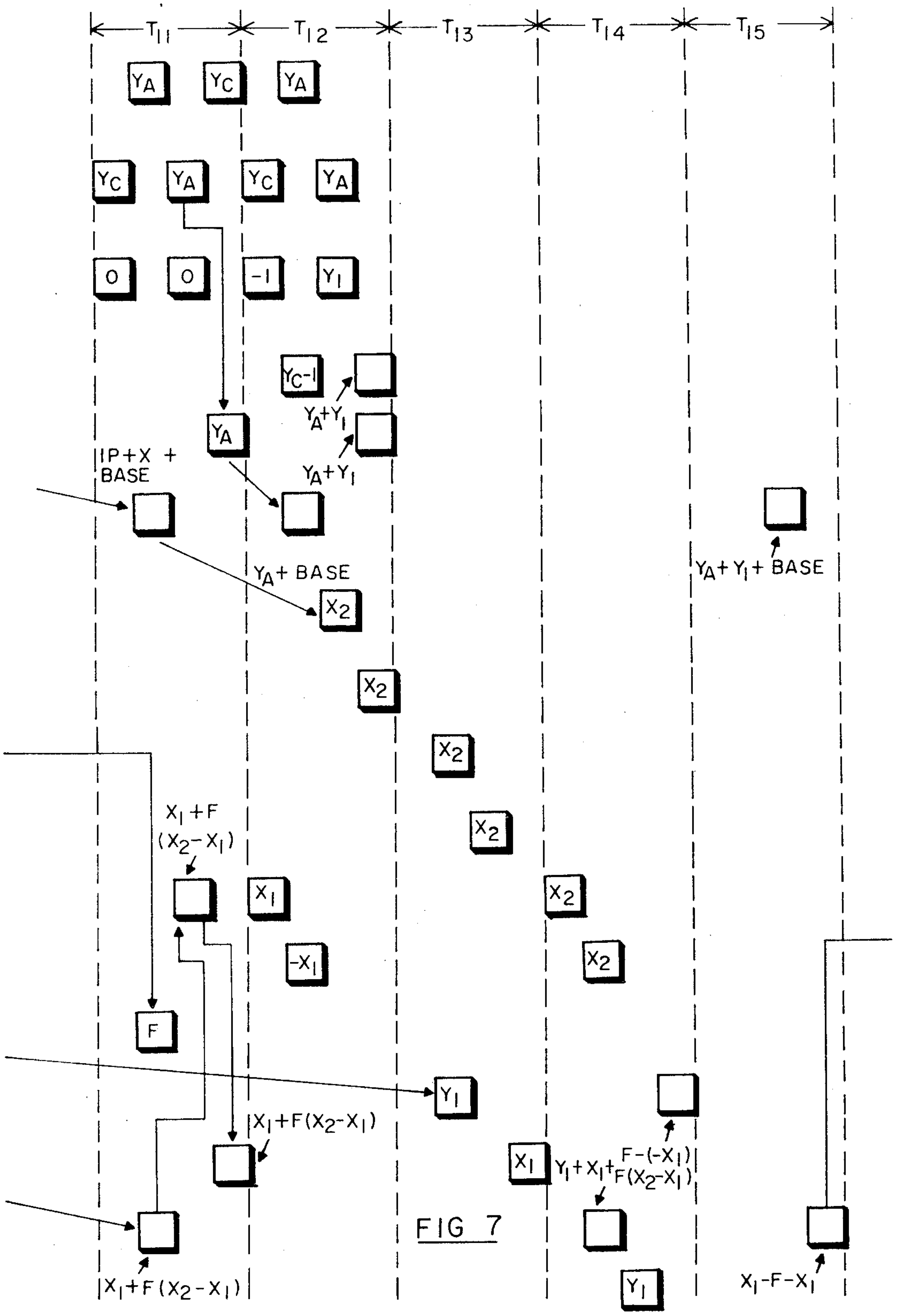

In the meantime the computed value of $Y_1$, which is equal to the quantity $X_1 + F(X_2 - X_1)$ has been transferred from the output of adder 134 in FIG. 2 back through the ZY read register 129 and into the augend register 133, as shown by the two blocks at time $T_{11}$, rows 16 and 15 of FIG. 7.

Thus, the computed $Y_i$ value in augend register 133 is added to the $Y_1$ value (also identified as $Y_b$) at the output of multiplier 132 by the adder 134 to produce the final result which is as follows:

$$Y_r = Y_b + X_1 + F(X_2 - X_1)$$

The above quantity is represented by the block at time $T_{14}$, row 16, of FIG. 7. It is this last-mentioned quantity that is supplied to the ZY write register 135 of FIG. 2 and is then sent to memory to the same Y address from which was fetched the word labeled $Y_A$ at time $T_4$, row 1, of FIG. 5.

In order for the final computed $Y_r$ value to be stored in the proper address in memory, which is $Y_A$, it is again necessary to bring $Y_A$ out of the IGRX register 101 of FIG. 1, and to place said $Y_A$ address into the S register which accesses the main memory so that the quantity $Y_r$ can be stored in the $Y_A$ address. The logic by which the $Y_A$ address is brought out of address 35 of IGRX 101 is the same as discussed herein before with respect to $X_{SA}$ which was done under control of the IGRX sequencer 100. It is to be noted that both the Y count $Y_C$ and the Y address, contained respectively in addresses 37 and 36 of IGRX sequencer 101 are brought out at this time, $T_{10}$ and $T_{11}$, even though the Y count is not actually needed. The reason that both $Y_C$ and $Y_A$ are brought out is due to the inherent characteristics of IGRX sequencer 101. More specifically, it is easier to follow the format of bringing both the $Y_C$ and $Y_A$ out rather than bringing out only $Y_A$.

The transfer of $Y_A$ from IGRX sequencer 101 of FIG. 1 to the register is shown in the timing diagram of FIG. 4A. More specifically, at time intervals $T_{10}$ and $T_{11}$, $Y_C$ and $Y_A$ are brought out and subsequently placed into data address register 114 of FIG. 1, as shown in row 2 of FIG. 7. Since neither decrementing or incrementing is necessary with either $Y_C$ or $Y_A$, zeros appear in row 3 at time $T_{11}$ in FIG. 7. Thus the output of adder 120 is simply $Y_A$ as shown in $T_{11}$, row 5, of FIG. 7. The quantity $Y_A$ is subsequently transferred to the S register as shown at time $T_{12}$, row 6, where the base address is added thereto. Thus, the absolute address of Y is equal to $Y_A$ the base address, which absolute address will remain in the S register until the completion of the computation of the $Y_r$ value as shown in block at time $T_{14}$, row 17.

It is to be noted that $Y_c$ and $Y_A$ from addresses 37 and 36 of IGRX 101 in FIG. 1 were brought out of said IGRX two times during the process of completing the first computation for Y. The first time $Y_C$ and $Y_A$ were brought out of IGRX was to obtain from main memory the predetermined value of Y which was to be added to the computed value of Y by the interpolation procedure. The second time the $Y_A$ word was brought out of IGRX was to access the same address in main memory so that the final computed value of Y, which is the sum of the $Y_i$ value computed by the interpolation process and the $Y_b$ value obtained from main memory, could be returned to said same address in main memory. As discussed above, $Y_C$ was brought out the first time for decrementing purposes and was brought out the second time solely for purposes of convenience.

It can be seen from the timing diagrams of FIGS. 5 – 8 that well before the $Y_A$ word is brought out from IGRX the second time, new values of 1P, 2P and ΔP are obtained from main memory. new values of 1P, 2P and ΔP are shown in the time interval $T_5$ and $T_6$, row 1, of FIGS. 5 and 6. Comparison of 2P against 1P is made. If 2P is greater than 1P then $X_A$ is accessed from the IGRX 101 of FIG. 1 and new X values ($X_2$ and $X_3$) are obtained from main memory in substantially the same manner as the original X values ($X_1$ and $X_2$) were obtained in the case of the first cycle of computation.

The next step in the second cycle of computation is to bring out the $Y_C$ and $Y_A$ words from addresses 37 and 36 of IGRX 101 of FIG. 1 as shown at times $T_{11}$ and $T_{12}$, row 1, of FIG. 7. $Y_C$ is then brought into the data addressing register 114 of FIG. 1 and a minus 1 is brought into the data address increment register 113. Addition occurs which decrements the Y count $Y_C$. The decremented count $Y_C - 1$ is then transferred to the ZX write register 104 and thence into the IGRX register 101 under control of IGRX sequencer 100. The timing of the placing of the minus 1 in the data address increment register 113 of FIG. 1, and the placing of the decremented $Y_C$ count into the ZX write register 104 are shown at time $T_{12}$, rows 3 and 4, of FIG. 7.

The $Y_A$ word is brought into the ZX read register 111 of FIG. 7 at time interval $T_{12}$, row 1, of FIG. 7. Such $Y_A$ word is then transferred to the data address register 113 of FIG. 1. The Y index value, $Y_1$ which is obtained from the $OCW_Y$ word in address 36 of IGRX register 101 in FIG. 1 is then transferred to the data address increment register 120 as indicated by the block $Y_I$ at time $T_{12}$, row 3, of FIG. 7. Addition of $Y_A$ and its index $Y_I$ occurs in adder 120 of FIG. 1 and the sum thereof supplied both to the relative addressing register 180 and also to the ZX write register 104 as indicated by the blocks at time $T_{12}$, rows 4 and 5, of FIG. 7.

The output of the relative address register 180 of FIG. 1 is then supplied to the absolute addressing register 181 where the relative base address is added to form the absolute address of the Y value to be obtained from main memory. The time that $Y_A + Y_I +$ base is supplied to the S register is represented by the block at time $T_{15}$, row 6, of FIG. 7. The blocks marked $Y_2$ in rows 7, 8, 9, 10, 11 and 12 at times $T_{16}$, $T_{17}$ and $T_{18}$ in FIG. 8 represent the flow of the accessed $Y_2$ word from main memory in the logic of FIG. 1. As in the case of the $Y_1$ value obtained during the first computation, the $Y_2$ value will be added to the computed $Y_i$, which is shown in $T_{19}$, row 15.

It is to be noted that when $Y_C$ and $Y_A$ are brought out of the IGRX register 101 at time $T_{12}$, row 1, of FIG. 7 the computations on the first set of P values is being performed. The foregoing is an important feature of the invention in that while the computation for a given cycle of operation is being performed in a first portion of the logic, subsequent cycle of operation is being performed in another portion of the logic.

C. FLOW CHART OF INTERPOLATION ARITHMETIC INSTRUCTIONS

Figure 9:
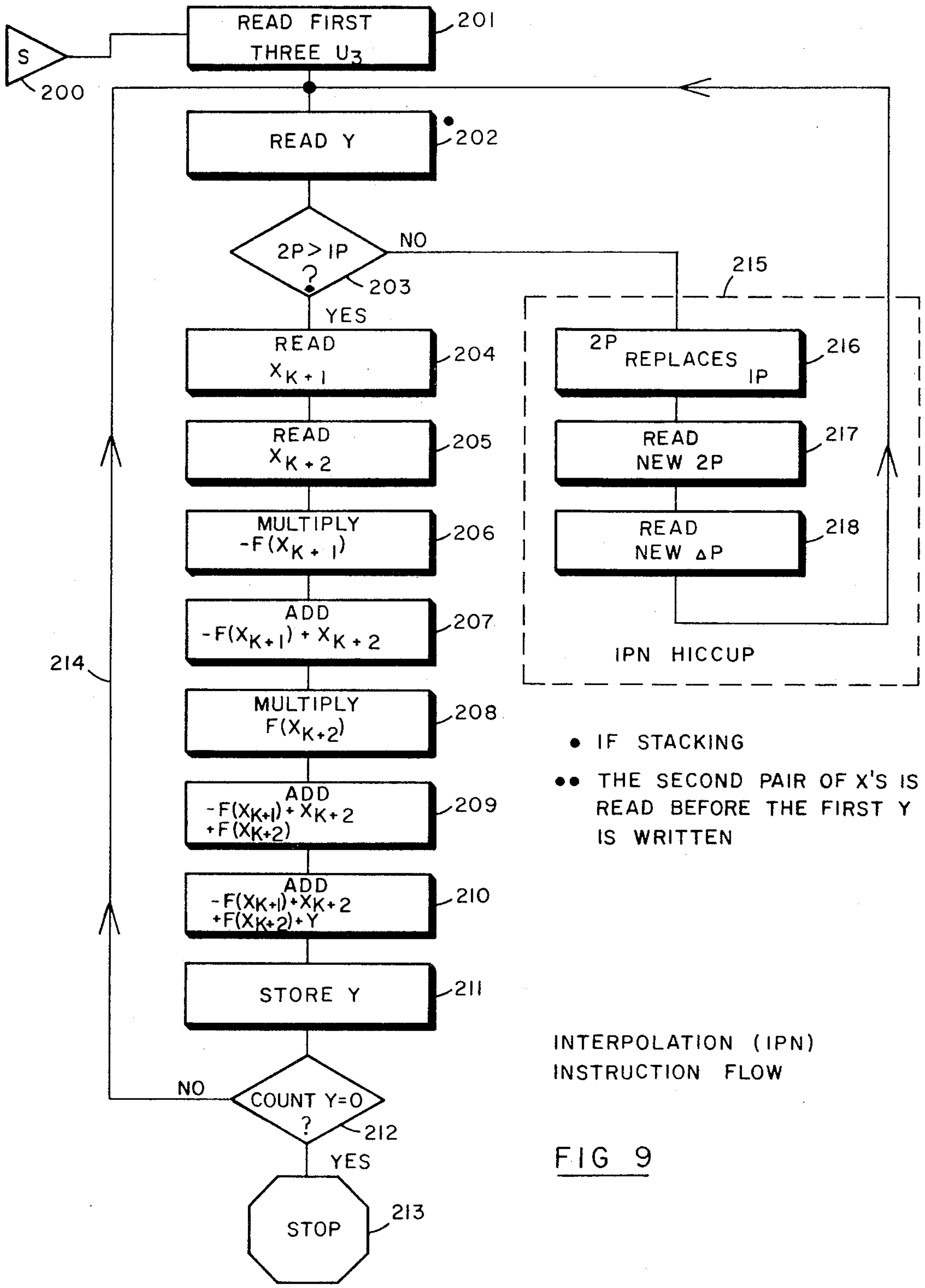
FIG. 9 is a flow chart of the interpolation instruction steps.

Referring now to FIG. 9 there is illustrated another flow chart which specifically shows the algorithm for the arithmetic or computational portion of the structure, as contrasted to the flow chart of FIG. 4 which shows the algorithm for the indexing and incrementing (i.e., address generation) of the various quantities. In FIG. 9 the program is started at block 200, and then the first three U array values are fetched from main memory to bring in the first P values, namely 1P, ΔP, and 2P, as shown in step 201. In the stacking mode of operation the Y address is accessed and the Y quantity brought in as shown in step 202. Next, the comparison between the magnitudes of 2P and 1P is made. If 2P is greater than 1P then the value of $X_K$ is read from main memory followed by a reading of the value $X_K$+1. In the example that has been discussed above in connection with the timing diagram of FIGS. 5 – 8, $X_K$ has been defined as $X_1$, and $X_K$+1 has been defined as $X_2$.

The reading of $X_K$ and $X_{K+1}$ is indicated by steps 204 and 205 in FIG. 9. The Y quantity stored at address $X_K$ is then multiplied by the fractional portion F of the 1P quantity, as indicated in step 206. It is to be noted that the polarity sign change is effected as discussed hereinbefore. In step 207 the result of step 206 is added to $X_K$. Next, in step 208 the second Y quantity represented by $X_{K+1}$, is multiplied by F. Then in step 209 the resultant product is added to the quantity obtained in step 207.

In the stacking mode which as been discussed hereinbefore, it is then necessary to add a bias value of $Y_b$ obtained in step 202 of FIG. 9. Such $Y_b$ value is added to the result obtained in step 209 to produce the sum indicated in step 210. Such sum is the new computed Y total which is then stored in the same Y address from which Y of step 202 was read. The storing of the Y in said same address is represented by step 211 in FIG. 9. The count of Y is then checked for zero value as shown in step 212. If the Y count has not reached zero then another cycle of operation must be made as indicated by the feedback line 214. If the Y count does equal zero then the program is ended as indicated by the stop step 213.

The logic for replacing the P values is shown in FIG. 9 as it was shown in FIG. 4. More specifically, in FIG. 9 the steps shown within the dotted block 215 represent the logic followed in the event that 2P has become less than 1P. The same description as made with respect to FIG. 4 is applicable to FIG. 6A.

IV. FORMATS OF TYPICAL OPERAND CONTROL WORDS.

Figure 10:
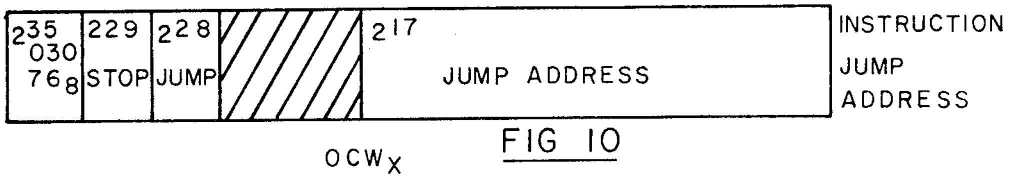
FIGS. 10, 11, 12 and 13 show a typical format of the operand control words employed in the invention.
Figure 11:
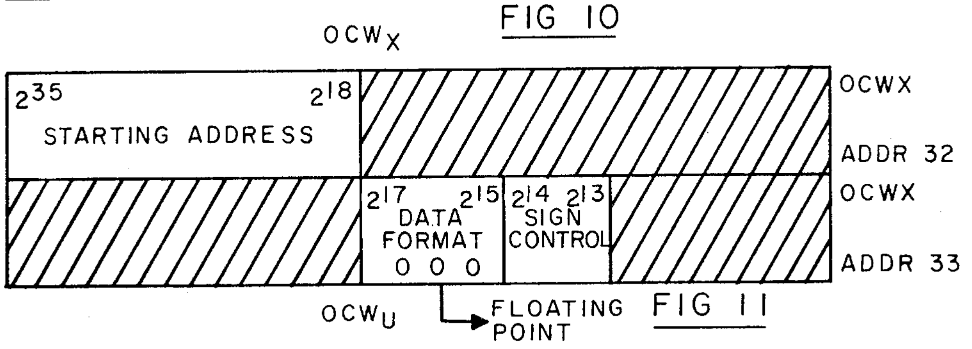
Figure 12:
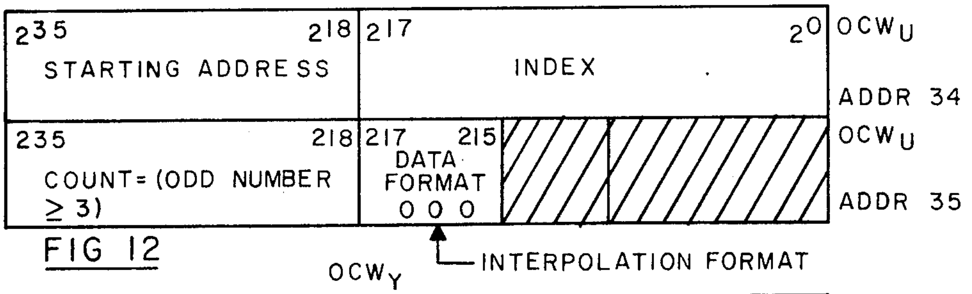
Figure 13:
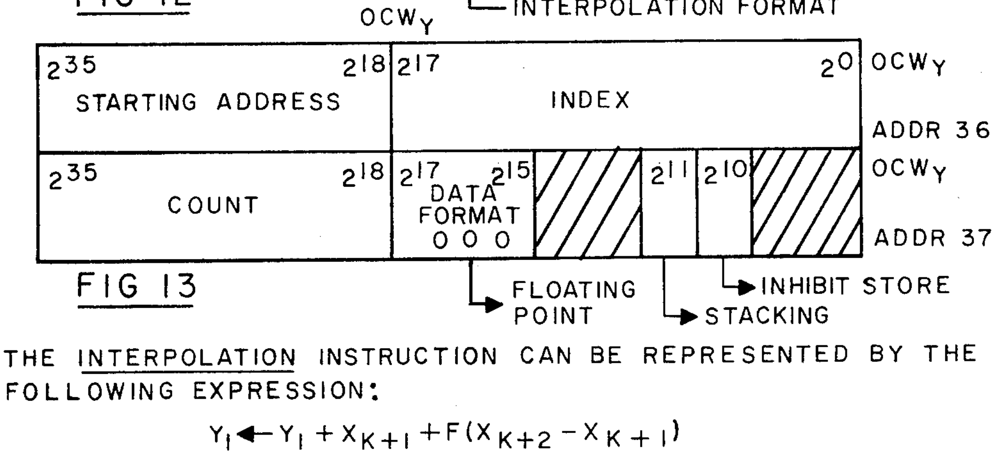

FIGS. 11, 12 and 13 show formats for typical operand control words which can be used in the invention, and FIG. 10 shows a jump instruction used at the end of the IPN sequence. In all of the words shown in FIGS. 10 – 13 the word length is 36 bits and the shaded areas thereof are not used.

Consider first the jump instruction word of FIG. 10 This jump instruction is stored in address 31 of IGRX 101 of FIG. 1 and is under the control of the IGRX sequencer 101 and is utilized at the end of the IPN sequence when either the Y count or the U count goes to zero to determine what function the processor should perform next. As such, it provides a convenient way to exit from the routine.

While the word in FIG. 10 is indentified as a jump instruction, it can, in fact, either command a jump to another instruction address or it can stop the processor, depending on the setting of the jump bit $2^{28}$ and the stop bit $2^{29}$ in FIG. 10. If the jump bit $2^{28}$ is set the processor will jump to the address defined by the 18 lower bits $2^0$ – $2^{17}$ of the instruction.

FIG. 11 shows the two 36 bits $OCW_X$ words which are stored in addresses 32 and 33 of IGRX 101 of FIG. 1. The upper 18 bit positions of the upper word of FIG. 11 define the $X_{SA}$, the starting address of the X array. The bits $2^{13}$ through $2^{17}$ of the lower 36 bit word are control bits which control the sign and the data format.

Since the X addresses are all determined by $X_{SA}$ plus the integer portion of 1P there is no need for an index value in the $OCW_X$ words. Further, since the termination of the IPN sequence is determined by the U count or the Y count going to zero, there is no need for a count value in the $OCW_X$ words.

In FIG. 12 there is shown the two 36 bit $OCW_U$ words which are stored in addresses 34 and 35 of the IGRX register 101 of FIG. 1. The upper 18 bit positions $2^{18}$ – $2^{35}$ of the upper 36 bit word contains the starting address of the U array and the lower 18 bit positions $2^0$ – $2^{17}$ contain the index value. In the lower 36 bit word the upper 18 bit positions $2^{18}$ – $2^{35}$ contain the U count. Such count must be equal to, or greater than three, and must be odd. The foregoing count characteristics are required since the very first cycle of computation requires that three P values 1P, ΔP and 2P be obtained, and two additional U values are required each time 2P becomes less than 1P. Bit positions $2^{15}$ – $2^{17}$ of the lower word in FIG. 12 are control bits for controlling the format.

In FIG. 13 is shown the two 36 bit $OCW_Y$ words which are used in the stacking mode of operation. The upper word contains the Y starting address $Y_{SA}$ in the upper 18 bit positions $2^{18}$ – $2^{35}$, and the Y index value, $Y_I$ in the lower 18 bit positions $2^0$ – $2^{17}$.

The lower 36 bit $OCW_Y$ word in FIG. 13 contains the Y count in the upper 18 bit positions $2^{17}$ – $2^{35}$. Bit positions $2^{10}$, $2^{11}$, and $2^{15}$ – $2^{17}$ contain control bits.

To be noted specifically is bit position $2^{11}$ which when set indicates the stacking mode of operation.

It is to be understood that the form of the invention shown and described herein is but a preferred embodiment thereof and that various changes can be made in the logic elements without departing from the spirit or scope thereof.

What is claimed is:

1. In a data processor having a memory and an arithmetic means, an interpolation system for computing, from a number of known X and Y points on a curve in an X—Y coordinate system, a predetermined number of additional points, and comprising:

first general storage means for storing a plurality of operand control words for said interpolation procedure;

first sequencing means responsive to an interpolation instruction to read said plurality of operand control words from said memory into predetermined address locations of said first general storage means;

said operand control words defining the starting address of operand values in an array of such values, and a count of the number of such values in an array, with each operand control word having self-identifying tags;

said first sequencing means constructed to read said operand control words out of said first general storage means in predetermined order;

accessing means responsive to one of said operand control words being read out of said first general storage means to fetch a first 1P value, a first ΔP value and a first 2P value from memory and to store said 1P, ΔP and 2P values in predetermined addresses in said first general storage means, and where 1P is composed of an integer portion and a fractional portion F;

decrementing means for decrementing said count each time an operand value is accessed from memory;

means for fetching from memory the words stored at two predetermined sequential addresses by means of identification contained in said 1P value;

arithmetic means for computing the value of $Y_i$ in the expression:

$$Y_i = X_K + F(X_{K+1} - X_K)$$

where $F$ is said fractional portion of said 1P value;

means for changing the value of 1P after each computation of $Y$ by adding ΔP to 1P to obtain a new value of F; and means for comparing the value of 2P with 1P and for obtaining new values of 1P, ΔP and 2P when 2P becomes less than 1P.

2. An interpolation system in accordance with claim 1 and further comprising:

second general storage means;

second sequencing means constructed to control the entry of values accessed from memory into predetermined addresses in said second general storage means;

said second sequencing means further constructed to read said values out from said second general storage means and into said arithmetic means;

means for supplying the fractional value F to said arithmetic means;

said arithmetic means constructed to respond to said values and to said fraction F to compute $Y_i$; and means for storing the computed values of $Y_i$.

3. An interpolation system in accordance with claim 1 in which said first sequencing means is responsive to said interpolation instruction to read a first operand control word into said first general storage means;

said operand control word defining the starting address $Y_{SA}$ and an indexing value $Y_I$ for said starting address $Y_{SA}$ to compute an updated address $Y_A$;

said first sequencing means constructed to read an operand out of said first general storage means once for each computation of a $Y_i$ value;

said accessing means responsive to the reading out of said operand control word from said first general storage means to fetch a $Y_b$ value from an address $Y_A$ in memory which is defined by said operand control word;

a second general storage means; and second sequencing means constructed to control the entry of $Y_b$ into a given address of said second general storage means;

said second sequencing means constructed to read $Y_b$ out of said second general storage means when $Y_i$ has been computed in said arithmetic means;

said arithmetic means further constructed to respond to the reading of $Y_b$ from said second general storage means to add $Y_b$ to the computed $Y_i$ value to produce a resultant $Y_r$ value;

said accessing means responsive to the completion of the computation of $Y_r$ and to the $Y_A$ address to store $Y_r$ in $Y_A$.

4. An interpolation system in accordance with claim 1 in which said first sequencing means is constructed to respond to said interpolation instruction to read a first operand control word into said first general storage means;

said first operand control word defining the starting address $Y_{SA}$ of a first operand in an array and an indexing value $V_I$;

said first sequencing means constructed to read said starting address out of said first general storage means each time a computation of a $Y_i$ value is made;

said accessing means responsive to the reading of said address from said first general storage means to fetch a $Y_b$ value from that address $Y_A$ in memory which is defined by the operand control word;

said arithmetic means responsive to said fetched $Y_b$ value to add said $Y_b$ value to the computed $Y_i$ value to produce a resultant $Y_r$ value;

said accessing means responsive to the completion of the computation of $Y_r$ and to the determined $Y_A$ address to store $Y_r$ in $Y_A$.

5. In a data processor having a memory and an arithmetic means, an interpolation system for interpolating from a number of known X and Y sets of points on a curve in an X—Y coordinate system, a predetermined number of additional sets of points and comprising:

first general storage means for storing control words for performing said interpolation function;

means responsive to an interpolation instruction to read U array operand control words and X array operand control words from memory to said first general storage means;

said operand control words defining the starting addresses of the U array and the X array, and the count of the number of elements in said U array, and with each control word having self-identifying tags;

first sequencing means constructed to read said operand control words out of said first general storage means in predetermined order;

incrementing and fetching means responsive to the said U array operand control words being read out of said first general storage means to fetch a first 1P value, a first ΔP value and a first 2P value from main memory and to store said first 1P, ΔP and 2P values in said first general storage means, where 1P is composed of an integer portion and a fractional portion F;

decrementing means for decrementing said U array count each time a data element in the U array is accessed from memory;

said incrementing and fetching means constructed to add the integer portion of said 1P value to said starting address word to determine addresses $X_K$ and $X_{K+1}$ and to fetch the words in addresses $X_K$ and $X_{K+1}$ from memory;

said arithmetic means constructed to compute the value of $Y_i$ in the expression:

$$Y_i = X_K + F(X_{K+1} - X_K)$$

where $F$ is the fractional portion of 1P;

means for adding ΔP to the fractional portion of 1P after each computation of $Y_i$ to obtain a new value of $F$; and means for obtaining new values of 1P, ΔP and 2P when 2P becomes less than 1P;

said arithmetic means being operationally independent of said fetching means to enable computation of $Y_i$ for a given cycle of operation while said fetching means are fetching the P and X values for the next subsequent computation of $Y_i$.

6. An interpolation system in accordance with claim 5 and further comprising:

second general storage means;

second sequencing means constructed to control the entry of X array values accessed from memory into predetermined addresses in said second general storage means;

said second sequencing means further constructed to read said X array values out from said second general storage means and into said arithmetic means;

means for supplying the fractional value F to said arithmetic means;

said arithmetic means constructed to respond to said X values and to said fraction F to compute $Y_i$; and means for storing the computed values of $Y_i$.

7. An interpolation system in accordance with claim 5 in which said first sequencing means is constructed to respond to said interpolation instruction to read a Y array operand control word into said first general storage means;

said Y array operand control word defining the starting address $Y_{SA}$ of the Y array and an indexing value $Y_I$ for said Y array;

said first sequencing means constructed to read said Y address out of said first general storage means each time a computation of a $Y_i$ value is made;

said accessing means responsive to the reading of said Y address from said first general storage means to fetch a $Y_b$ value from that address $Y_A$ in memory which is defined by the Y array operand control word;

said arithmetic means responsive to said fetched $Y_b$ value to add said $Y_b$ value to the computed $Y_i$ value to produce a resultant $Y_r$ value;

said accessing means responsive to the completion of the computation of $Y_r$ and to the determined $Y_A$ address to store $Y_r$ in $Y_A$.

8. In a data processor comprising a memory and an arithmetic means, an interpolation system for interpolating, from a number of known X and Y sets of points in an X—Y coordinate system, an additional number of X—Y sets of points by means of U and X operand control words containing the starting addresses of U and X data arrays and the count of U and comprising:

indexing and accessing means for accessing the successive U array addresses to obtain values of 1P, ΔP and 2P, where 1P has an integer portion and a fractional portion F;

said indexing and accessing means responsive to the integer portion of said 1P value and to the starting address contained in the X operand control word to access X addresses $X_K$ and $X_{K+1}$;

said arithmetic means constructed to compute the value $Y_i$ in the following expression;

$$Y_i = X_K + F(X_{K+1} - X_K)$$

and means for storing $Y_i$;

said arithmetic means and said indexing means constructed to function and substantially independently of each other to enable the indexing and accessing of the X and U operand control words for a given cycle of operation to determine a given $Y_i$, while the arithmetic means is performing the computations for the preceding cycle of operation to determine the immediately preceding $Y_i$.

* * * * *

UNITED STATES PATENT OFFICE

CERTIFICATE OF CORRECTION

Patent No. 3,748,447 Dated July 24, 1973

Inventor(s) HAJICEK, JAMES D., ET. AL.

It is certified that error appears in the above-identified patent and that said Letters Patent are hereby corrected as shown below:

Column 20, line 13, "V" should read -- Y -- .

Signed and sealed this 25th day of December 1973.

(SEAL)
Attest:

EDWARD M. FLETCHER, JR.
Attesting Officer

RENE D. TEGTMEYER
Acting Commissioner of Patents